(12) United States Patent
Chen et al.

(10) Patent No.: US 8,381,589 B2
(45) Date of Patent: Feb. 26, 2013

(54) SINGLE-AXIS-CONTROL-INPUT GYROSCOPE SYSTEM HAVING IMPERFECTION COMPENSATION

(75) Inventors: Tsung-Lin Chen, Taipei (TW); Chien-Yu Chi, Taichung County (TW); Chia-Wei Lee, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 296 days.

(21) Appl. No.: 12/801,728

(22) Filed: Jun. 23, 2010

(65) Prior Publication Data

US 2011/0314910 A1 Dec. 29, 2011

(51) Int. Cl.
*G01C 19/56* (2006.01)
(52) U.S. Cl. ..................... 73/504.12; 73/1.77
(58) Field of Classification Search .............. 73/504.12, 73/504.04, 504.14, 504.15, 504.02, 1.37, 73/1.77
See application file for complete search history.

(56) References Cited

U.S. PATENT DOCUMENTS

| | | | | |
|---|---|---|---|---|
| 6,067,858 | A * | 5/2000 | Clark et al. ............. | 73/504.16 |
| 6,845,669 | B2 * | 1/2005 | Acar et al. ............. | 73/504.14 |
| 6,928,874 | B2 | 8/2005 | Painter et al. | |
| 6,934,660 | B2 | 8/2005 | Painter et al. | |
| 7,377,167 | B2 * | 5/2008 | Acar et al. ............. | 73/504.14 |
| 8,166,817 | B2 * | 5/2012 | Chen et al. ............. | 73/504.14 |
| 2011/0259100 | A1 * | 10/2011 | Chen et al. ............. | 73/504.12 |

* cited by examiner

*Primary Examiner* — Helen C. Kwok
(74) *Attorney, Agent, or Firm* — Muncy, Geissler, Olds & Lowe, PLLC (57) ABSTRACT

The present invention proposes a single-axis-control-input gyroscope system having imperfection compensation, which comprises a gyroscope and a state observer. The gyroscope includes a mechanical structure, and the dynamic behavior of the mechanical structure is described with a plurality of system parameters and a plurality of dynamic equations. The system parameters include a mass of the gyroscope, two main-axis spring constants, a cross-axis spring constant, two main-axis damping coefficients, a cross-axis damping coefficient and an angular velocity. The mechanical imperfections cause the system parameters to deviate from the designed values and become unknown values. The gyroscope receives a single-axis control signal and outputs a plurality of gyroscopic system dynamics. The single-axis control signal includes at least two frequency signals. The state observer is coupled to the gyroscope to receive the gyroscopic system dynamics as the inputs thereof to feed back compensations to the state observer. Thereby is estimated an angular velocity.

3 Claims, 7 Drawing Sheets

Fig.4H

SINGLE-AXIS-CONTROL-INPUT GYROSCOPE SYSTEM HAVING IMPERFECTION COMPENSATION

FIELD OF THE INVENTION

The present invention relates to a gyroscope system, particularly to a single-axis-control-input gyroscope system having imperfection compensation, which can detect and evaluate the dynamic effect alteration caused by mechanical imperfections to obtain a correct angular velocity.

BACKGROUND OF THE INVENTION

Gyroscopes are inertial sensors for orientation, stable control and navigation. Because of bulkiness and expensiveness, the traditional gyroscope is hard to be widely used. The advanced MEMS (Mirco Electro Mechanical System) technology has greatly favored the design and fabrication of MEMS gyroscopes in the recent years. The emerging MEMS gyroscopes have been extensively applied to electronic products, such as game machines, 3D mice, image stabilization systems of video cameras, navigation systems of vehicles and the like.

The fabrication process of the MEMS gyroscopes includes many steps. The steps inevitably cause some imperfections. The imperfections include mechanical structure imperfections (such as structural asymmetry and dimensional errors) and circuit imperfections (such as parasitic capacitors). Because of miniaturization of electro mechanical components, tolerance for the imperfections is greatly reduced in MEMS systems, and the imperfections are especially significant in MEMS systems. The present invention intends to compensate for the mechanical imperfections caused by design and fabrication of the electro mechanical components and reduce the instability of the dynamics so as to correctly estimate angular velocities.

In the conventional technology, in order to enhance the performance of the gyroscopes, especially the mechanical imperfections significantly affecting the precision of MEMS devices, post-processes are usually used to perform correction. However, such a prior art is complicated and expensive, and has high technical threshold. There are also few methods using feedback control to offset the effect caused by mechanical imperfections in gyroscopes to obtain correct angular velocities. These methods generally are applied to two-axes-control-input gyroscopes. However, most of the commercial MEMS gyroscopes use single-axis-control-input and thus cannot be corrected by those existing feedback control methods.

An U.S. Pat. No. 6,928,874 disclosed "Dynamically Amplified Micro-Machined Vibratory Angle Measuring Gyroscopes, Micro-Machined Inertial Sensors and Method of Operation for the Same", which adopts a two-axes-control-input gyroscope to replace a ring structure with an inner ring and an outer ring to reduce the interference between two axes. However, the mechanical structure of the prior art is very complicated. Besides, the prior art has to measure positions and velocities of the two axes at the same time. An U.S. Pat. No. 6,934,660 disclosed a "Multi Stage Control Architecture for Error Suppression in Micro-Machined Gyroscopes", which designs a two-stage controller. The prior art is based on hypotheses that the damping coefficient of the gyroscope is symmetric and there is no coupling term existing. However, the hypotheses are too impractical. Similar to the above-mentioned patent, this prior art also adopts two-axes-control-input and thus has to measure positions and velocities of the two axes at the same time.

SUMMARY OF THE INVENTION

One objective of the present invention is to provide a simple, low-cost and high-precision gyroscope system, which adopts single-axis-control-input and compensates for the mechanical imperfections of the gyroscope via signal processing of the control system, and which uses a gyroscope mechanical structure having a cross-axis damping coefficient and a cross-axis elastic coefficient to input signals having at least two frequencies by a single axis to estimate the parameters of the gyroscope system and the angular velocities.

Another objective of the present invention is to provide a gyroscope system having imperfection compensation, the gyroscope system includes a state observer uses the signal processing of the control system to feed back and compensate for the mechanical imperfections of the gyroscope system, whereby the angular velocity is correctly measured, and the correction is exempted from expensive post-processes.

The present invention proposes a single-axis-control-input gyroscope system having imperfection compensation, which comprises a gyroscope and a state observer. The gyroscope includes a mechanical structure. The dynamic behavior of the mechanical structure can be described by a plurality of system parameters and a plurality of dynamic equations. The gyroscope receives a single-axis control signal and outputs a plurality of system dynamics to two axes. The single-axis control signal includes at least two frequency signals. The state observer is coupled to the gyroscope and receives two of the system dynamics as the inputs thereof so as to feedback compensation to the state observer. Thus, the angular velocity of an object is measured by the gyroscope system of the present invention with the mechanical imperfections being compensated.

The technical contents of the present invention are described in detail in cooperation with the drawings below.

BRIEF DESCRIPTION OF THE DRAWINGS

The embodiments of the present invention are described with the following drawings.

DETAILED DESCRIPTION OF THE PREFERRED EMBODIMENTS

Below, the embodiments are used to exemplify and demonstrate the present invention. However, the embodiments are not intended to limit the scope of the present invention. Although the persons skilled in the art can easily make modifications or variations according to the embodiments and spirit implied in the embodiments, any modification or variation according to the embodiments and spirit implied in the embodiments is to be also included within the scope of the present invention.

Figure 1:
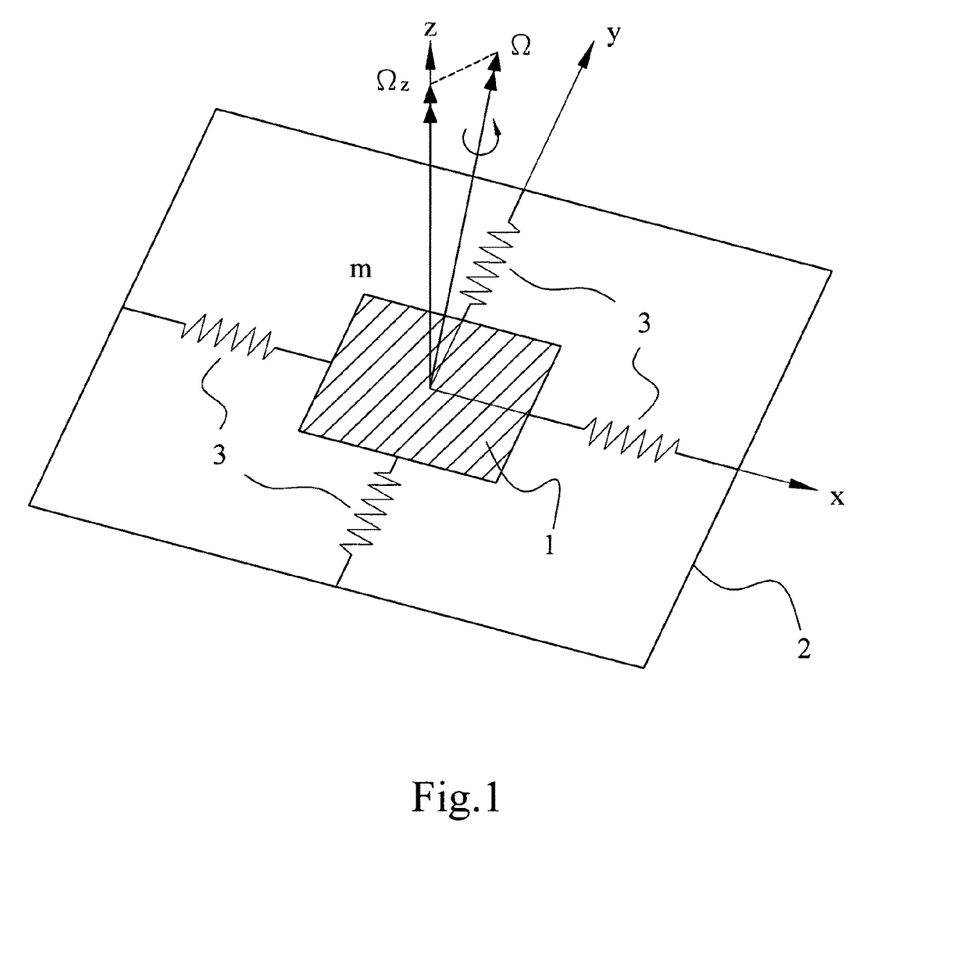
FIG. 1 is a diagram schematically showing a mechanical structure model of an MEMS linear vibratory gyroscope.

Refer to FIG. 1 for a mechanical structure model of an MEMS linear vibratory gyroscope. In FIG. 1, a gyroscope has a proof mass 1 (denoted by m), and the proof mass 1 has a centroid set in the origin of the x axis and y axis of a rotation coordinate. The proof mass 1 is coupled to a fixed frame 2 by a spring 3 having two-axes elastic coefficient. Thereby, the movement of the proof mass 1 is confined to the x-y plane, thus is formed a spring-mass-damper system. In practice, the spring 3 is usually realized with a serpentine structure, and a cross-axis spring constant is often introduced into the serpentine structure.

One of the x axis and y axis of the rotation coordinate functions as a driving axis, and the other functions as a sensing axis. For example, if the x axis functions as the driving axis and outputs driving force to make the proof mass 1 generate vibration with the same frequency along the x axis. If the fixed frame 2 rotates at the same time at an angular velocity $\Omega$, the proof mass 1 senses a Coriolis force in proportion to the product of the vibration speed on the driving axis (the x axis) and the angular velocity of the z axis, wherein the product is expressed by $\Omega_z \dot{x}$. The Coriolis force makes the proof mass 1 of the gyroscope vibrate on the sensing axis (the y axis). The signal of the angular velocity $\Omega_z$ can be obtained via processing the y axis.

The system dynamics of the proof mass 1 of the gyroscope in the x-y axes can be deduced from dynamics and simplified to the following equations:

$$m\ddot{x}+D_{xx}\dot{x}+D_{xy}\dot{y}+K_{xx}x+K_{xy}y=u_X+2m\Omega_z\dot{y} \tag{1}$$

$$m\ddot{y}+D_{xy}\dot{x}+D_{yy}\dot{y}+K_{xy}x+K_{yy}y=u_y-2m\Omega_z\dot{x} \tag{2}$$

wherein m is the mass of the proof mass 1, and
wherein $D_{xx}$ and $D_{yy}$ are respectively the x-axis and y-axis damping coefficients, and
wherein $K_{xx}$ and $K_{yy}$ are respectively the x-axis and y-axis spring constants, and
wherein $D_{xy}$ and $K_{xy}$ are respectively cross-axis damping coefficient and cross-axis spring constant, and
wherein $u_x$ and $u_y$ are respectively the x-axis and y-axis control inputs.

Normalize Equation (1) and Equation (2) to obtain the following equations:

$$\ddot{x}+d_{xx}\dot{x}+d_{xy}\dot{y}+k_{xx}x+k_{xy}y = u_x/m+2\Omega_z\dot{y} \tag{3}$$

$$\ddot{y}+d_{xy}\dot{x}+d_{yy}\dot{y}+k_{xy}x+k_{yy}y = u_y/m-2\Omega_z\dot{x} \tag{4}$$

wherein $d_{xx} = D_{xx}/m;$ $d_{yy} = D_{yy}/m;$ $d_{xy} = D_{xy}/m;$ $k_{xx} = K_{xx}/m;$ $k_{yy} = K_{yy}/m;$ $k_{xy} = K_{xy}/m$ In Equations (3) and (4), $d_{xy}$ and $k_{xy}$ are respectively the cross-axis damping coefficient and the cross-axis spring constant, which are originated from the asymmetry of the mechanical structure or dimensional errors and cause the dynamic coupling of the x axis and the y axis. Similarly, the system parameters, such as m, $d_{xx}$, $d_{yy}$, $k_{xx}$, $k_{yy}$, etc., are different from the original designed values based on the effect of the mechanical imperfections. Therefore, there are eight unknown system parameters affected by the mechanical imperfections, including $d_{xx}$, $d_{yy}$, $d_{xy}$, $k_{xx}$, $k_{yy}$, $k_{xy}$, m, and $\Omega_z$.

Rewrite Equations (3) and (4) into matrixes:

$$\dot{X}=f(X)+BU \tag{5}$$

$$Z=CX+\text{noise} \tag{6}$$

wherein
$X=[x\ \dot{x}\ y\ \dot{y}\ \Omega_z\ k_{xx}\ k_{yy}\ k_{xy}\ d_{xx}\ d_{yy}\ d_{xy}\ m]$, and
wherein $$f(X) = \begin{bmatrix} \dot{x} \\ -k_{xx}x-k_{xy}y-d_{xx}\dot{x}-d_{xy}\dot{y}+2\Omega_z\dot{y} \\ \dot{y} \\ -k_{xy}x-k_{yy}y-d_{xy}\dot{x}-d_{yy}\dot{y}-2\Omega_z\dot{x} \\ 0 \\ \vdots \\ 0 \end{bmatrix}_{12\times 1}$$

$$B = \begin{bmatrix} 0 & 1/m & 0 & 0 \\ 0 & 0 & 0 & 1/m \end{bmatrix}_{2\times 8}^T$$

$$U = \begin{bmatrix} u_x \\ u_y \end{bmatrix}$$

$$C = \begin{bmatrix} 0 & 1 & 0 & 0 \\ 0 & 0 & 0 & 1 \end{bmatrix}_{2\times 8}$$

To simplify the system, the noise in Equation (6) can be ignored and suppose that all $d_{xx}$, $d_{yy}$, $d_{xy}$, $k_{xx}$, $k_{yy}$, $k_{xy}$, m, and $\Omega_z$ are constants and can be simulated.

Figure 2:
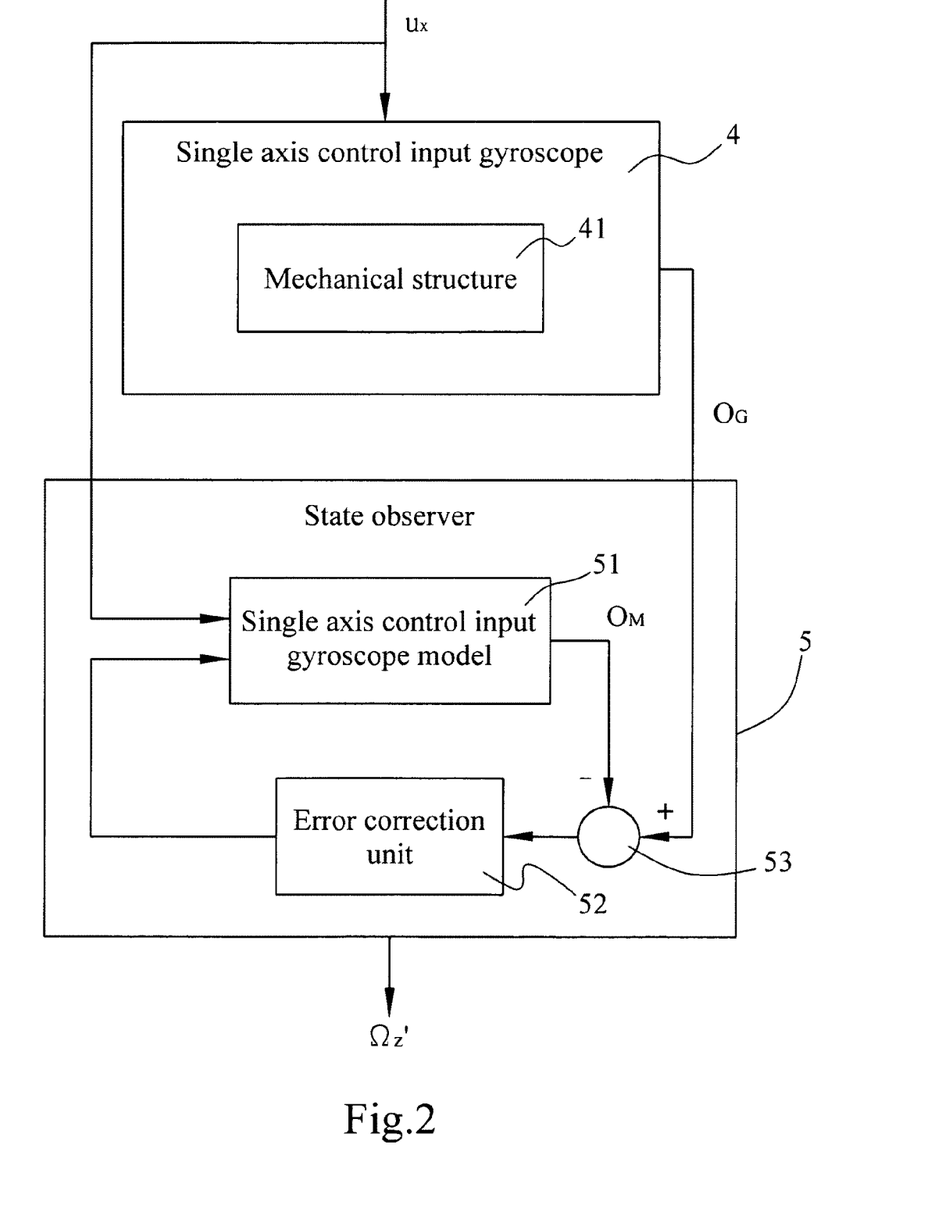
FIG. 2 is a block diagram schematically showing the architecture of a single-axis-control-input gyroscope system having imperfection compensation according to one embodiment of the present invention.

Refer to FIG. 2 for a single-axis-control-input gyroscope system having imperfection compensation according to one embodiment of the present invention. The gyroscope system of the present invention comprises a single-axis-control-input gyroscope 4 and a state observer 5. The single-axis-control-input gyroscope 4 includes a mechanical structure 41. The above-mentioned single-axis-control-input gyroscope is synonymous to the single-axis-control-input MEMS vibratory gyroscope. For the single-axis-control-input gyroscope of the present invention, there is no y-axis control input $u_y$, but only the x-axis control input $u_x$ in Equations (2), (4), and the matrix U in Equation (5), as shown in FIG. 2. Thus, $u_x$ is the single-axis control signal, and the gyroscope is the single-axis-control-input gyroscope. For simplicity and convenient illustration, the single-axis-control-input MEMS vibratory gyroscope is abbreviated to the single-axis-control-input gyroscope in the specification and claims of the present invention.

As shown in FIG. 2, the state observer 5 is coupled to the single-axis-control-input gyroscope 4. The state observer 5 is a device simulating the real system, wherein the input signals and output signals of the real system are used to estimate the internal states of the real system.

In one embodiment, the state observer 5 includes a single-axis-control-input gyroscope model 51, an error correction unit 52, and a subtractor 53. In the single-axis-control-input gyroscope model 51, the y-axis control input $u_y$ of Equations (2), (4) and (5) is neglected to construct and model the mechanical structure of the single-axis-control-input gyroscope 4. The single-axis-control-input gyroscope model 51 can be described by a plurality of system parameters and a plurality of dynamic equations, wherein the system parameters include the gyroscope proof mass m, the spring constants $k_{xx}$, $k_{yy}$, and $k_{xy}$, the damping coefficients $d_{xx}$, $d_{yy}$, and $d_{xy}$, and the angular velocity $\Omega_z$.

The single-axis-control-input gyroscope 4 receives a single-axis control signal (of the x axis) $u_x$ as the input thereof and generates a plurality of gyroscopic system dynamic outputs $O_G$. The gyroscopic system dynamic outputs $O_G$ can be obtained by measurement. The single-axis-control-input gyroscope model 51 also receives the single-axis control signal (of the x axis) $u_x$ as the input thereof and generates a plurality of model system dynamic outputs $O_M$, which are corresponding to the gyroscopic system dynamic outputs $O_G$. The gyroscopic system dynamic outputs $O_G$ include the position at the x axis (x), the position at the y axis (y), and/or the speed in the x axis ($\dot{x}$), and/or the speed in the y axis ($\dot{y}$), and/or the acceleration in the x axis ($\ddot{x}$), and/or the acceleration in the y axis ($\ddot{y}$), and/or higher order two-axes dynamics. The term "corresponding" refers to the fact that the single-axis-control-input gyroscope model 51 generates a one-to-one correspondent output with the gyroscopic system dynamic outputs $O_G$.

The subtractor 53 performs a subtraction operation between at least two model system dynamic outputs $O_M$ and the two corresponding gyroscopic system dynamic outputs $O_G$ to obtain the relative errors and sends the errors to the error correction unit 52. After receiving the errors, the error correction unit 52 works out the corresponding compensation values and feeds back the compensation values to the single-axis-control-input gyroscope model 51, whereby the single-axis-control-input gyroscope model 51 can correct the model system dynamic outputs $O_M$ thereof, and the model system dynamic outputs $O_M$ can gradually approach the gyroscopic system dynamic outputs $O_G$, and the eight system parameters can be estimated, including the estimated angular velocity $\Omega_z'$ of the gyroscope. Herein, the term "dynamic output" refers to that the output signal is a function of time. Therefore, the abovementioned "estimate" refers to a time-dependent iteration or feedback. In other words, the (n+1)th estimate of the system parameter is corrected by the dynamic output of the nth estimate. Thus, the final system parameters and the estimated angular velocity $\Omega_z'$ can gradually converge to the corresponding real values.

The two gyroscope system dynamic outputs that are input to the subtractor 53 are selected from the position at the x axis (x) and the position at the y axis (y), the speed in the x axis ($\dot{x}$) and the speed in the y axis ($\dot{y}$), the acceleration in the x axis ($\ddot{x}$) and the acceleration in the y axis ($\ddot{y}$), and the higher order differentials of the two corresponding axes.

Before constructing a state observer, the observability of the gyroscope coupled to the state observer should be confirmed first. If observability matrix of a system presents a full rank state, the system has observability. According to Equations (5) and (6), the observability matrix $W_o$ of the gyroscope may be arranged into:

$$W_0 = \begin{bmatrix} [C_1]_{4\times 4} & [0]_{4\times 8} \\ [0]_{8\times 4} & [W_{kd}]_{8\times 8} \end{bmatrix} \quad (7)$$

wherein $$C_1 = \begin{bmatrix} 0 & 1 & 0 & 0 \\ 0 & 0 & 0 & 1 \\ -k_{xx} & 0 & -k_{xy} & 0 \\ -k_{xy} & 0 & -k_{yy} & 0 \end{bmatrix}$$

and
wherein $$W_{kd} = \begin{bmatrix} 2\dot{y} & -\dot{x} & 0 & -\dot{y} & -\ddot{x} & 0 & -\ddot{y} & x^{(3)} \\ -2\ddot{x} & 0 & -\dot{y} & -\dot{x} & 0 & -\ddot{y} & -\ddot{x} & y^{(3)} \\ 2y^{(3)} & -\ddot{x} & 0 & -\ddot{y} & -x^{(3)} & 0 & -y^{(3)} & x^{(4)} \\ -2x^{(3)} & 0 & -\ddot{y} & -\ddot{x} & 0 & -y^{(3)} & -x^{(3)} & y^{(4)} \\ 2y^{(4)} & -x^{(3)} & 0 & -y^{(3)} & -x^{(4)} & 0 & -y^{(4)} & x^{(5)} \\ -2x^{(4)} & 0 & -y^{(3)} & -x^{(3)} & 0 & -y^{(4)} & -x^{(4)} & y^{(5)} \\ 2y^{(5)} & -x^{(4)} & 0 & -y^{(4)} & -x^{(5)} & 0 & -y^{(5)} & x^{(6)} \\ -2x^{(5)} & 0 & -y^{(4)} & -x^{(4)} & 0 & -y^{(5)} & -x^{(5)} & y^{(6)} \end{bmatrix}$$

wherein $x^{(n)}$ and $y^{(n)}$ respectively represent the nth order differentials of x and y.

Via examining $W_{kd}$, it is found that if $x \ne y' \dot{x} \ne \dot{y}' \ddot{x} \ne \ddot{y}' \ldots$, $W_{kd}$ is in a full rank state. In other words, if the control input of the gyroscope system includes the dynamics with at least two frequencies, $W_{kd}$ is in a full rank state. The state observer 5 can estimate and obtain the eight system parameters of the gyroscope system, including the mass m, the spring constants $k_{xx}$, $k_{yy}$, and $k_{xy}$, the damping coefficients $d_{xx}$, $d_{yy}$, and $d_{xy}$ and the angular velocity $\Omega_z$.

In comparison with Equations (5) and (6), the state observer 5 can be designed into:

$$\dot{\hat{X}} = f(\hat{X}) + BU + LC(X - \hat{X}) \quad (8)$$

$$\hat{Z} = C\hat{X} \quad (9)$$

wherein L is the gain of the state observer 5. The gain can be obtained via the conventional construction method of the state observer 5. Thus, the single-axis-control-input gyroscope system having imperfection compensation of the present invention can obtain an angular velocity $\Omega_z$ with the mechanical imperfections being compensated for. In other words, the estimated angular velocity $\Omega_z'$ will gradually approach the correct angular velocity $\Omega_z$.

When the selected control inputs are signals each having at least two frequencies, the system of the gyroscope 4 has observability. Therefore, the control input of the gyroscope 4 can be expressed as the following signal including at least two frequencies:

$$U = \begin{bmatrix} \sin(\omega_1 t) + \sin(\omega_2 t) \\ 0 \end{bmatrix} \quad (10)$$

wherein $\omega_1$ and $\omega_2$ are two frequencies selected arbitrarily.

In one embodiment, perform a simulation using the parameters with the values listed in Table.1 to verify the performance of imperfection compensation of the present invention.

TABLE 1 parameter values for simulation

| Parameter | Value |
|---|---|
| $\Omega_z$ | $\sin(2 \times \pi \times 100\ t)$ rad/sec |
| $k_{xx}$ | $(2 \times \pi \times 3000)^2$ sec$^{-2}$ |
| $k_{xy}$ | $(2 \times \pi \times 900)^2$ sec$^{-2}$ |
| $k_{yy}$ | $(2 \times \pi \times 3000)^2$ sec$^{-2}$ |
| $d_{xx}$ | 10 sec$^{-1}$ |
| $d_{xy}$ | 0 sec$^{-1}$ |
| $d_{yy}$ | 10 sec$^{-1}$ |
| M | 0.9 |

Figure 3A:
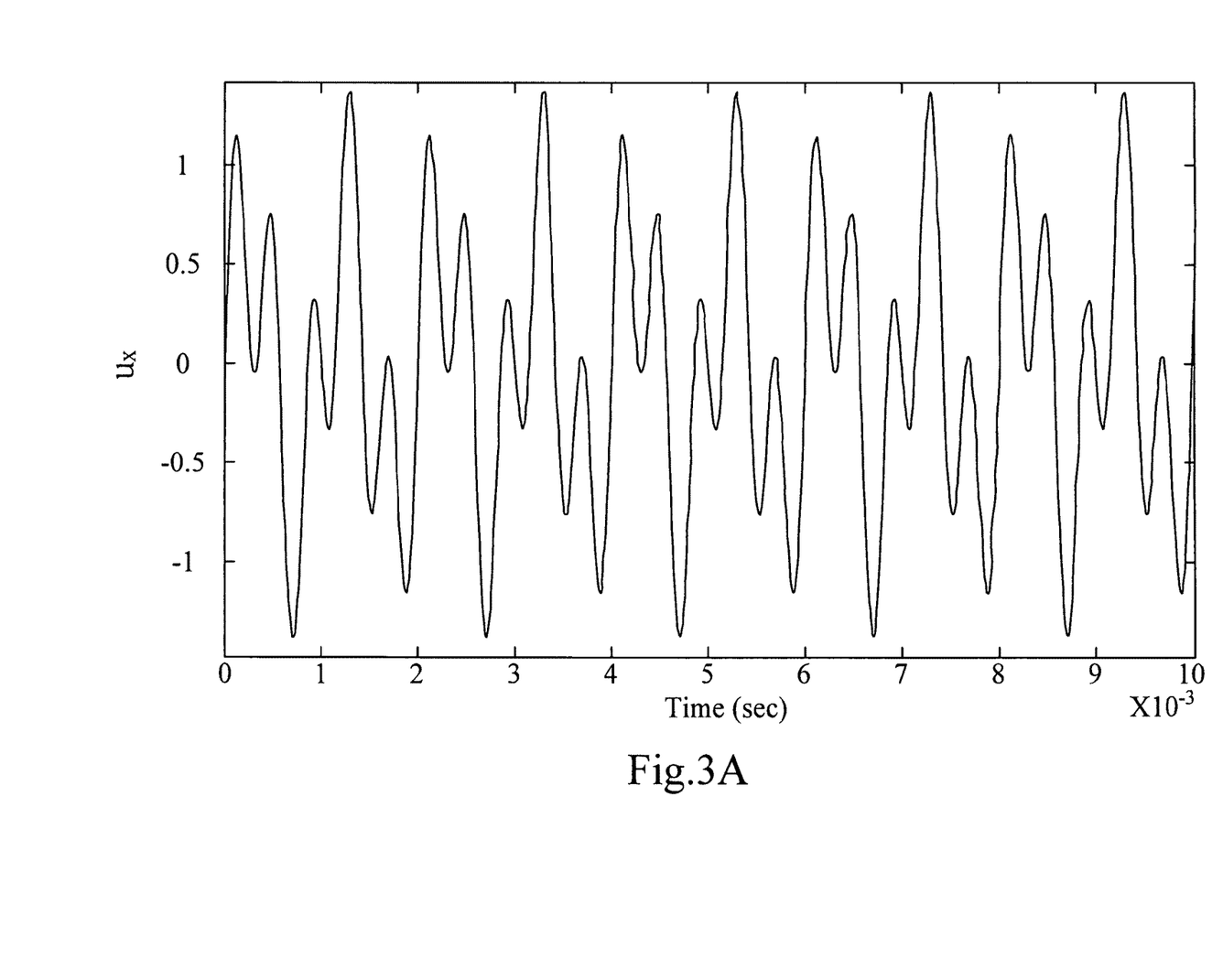
FIGS. 3A-3E are diagrams schematically showing that the single-axis of the gyroscope inputs system dynamics ($u_x$) with two frequencies to the state observer, and the state observer outputs values of the positions at the x axis and y axis and the velocities in the x axis and y axis of the model system dynamics to gradually approach real gyroscopic system dynamics.
Figure 3B:
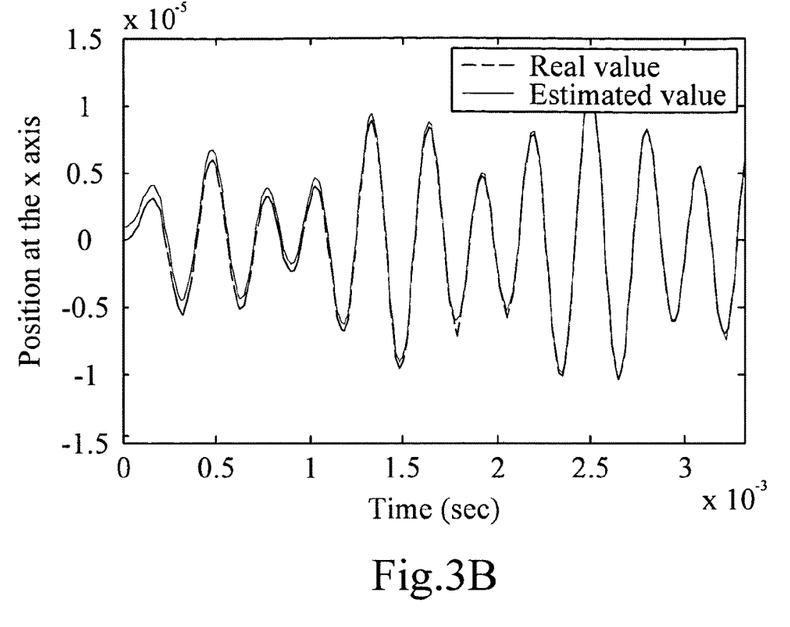
Figure 3C:
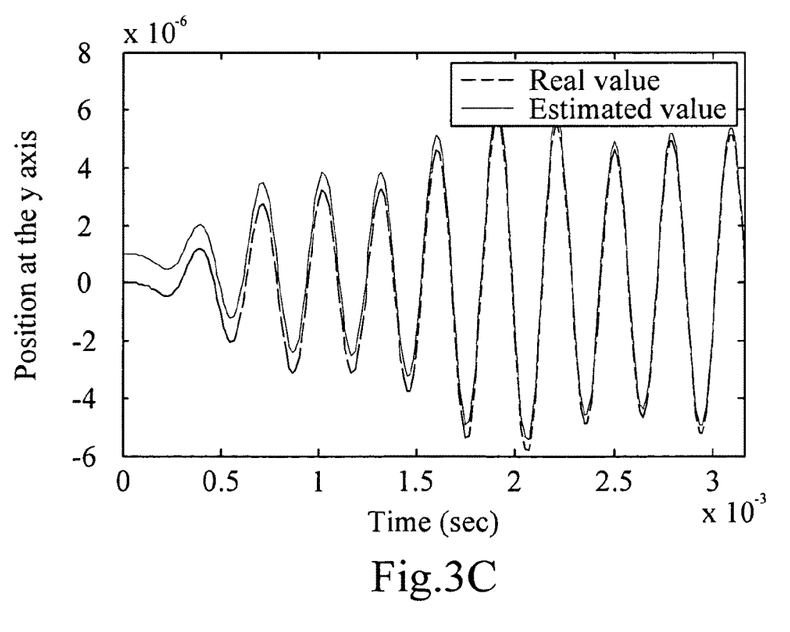
Figure 3D:
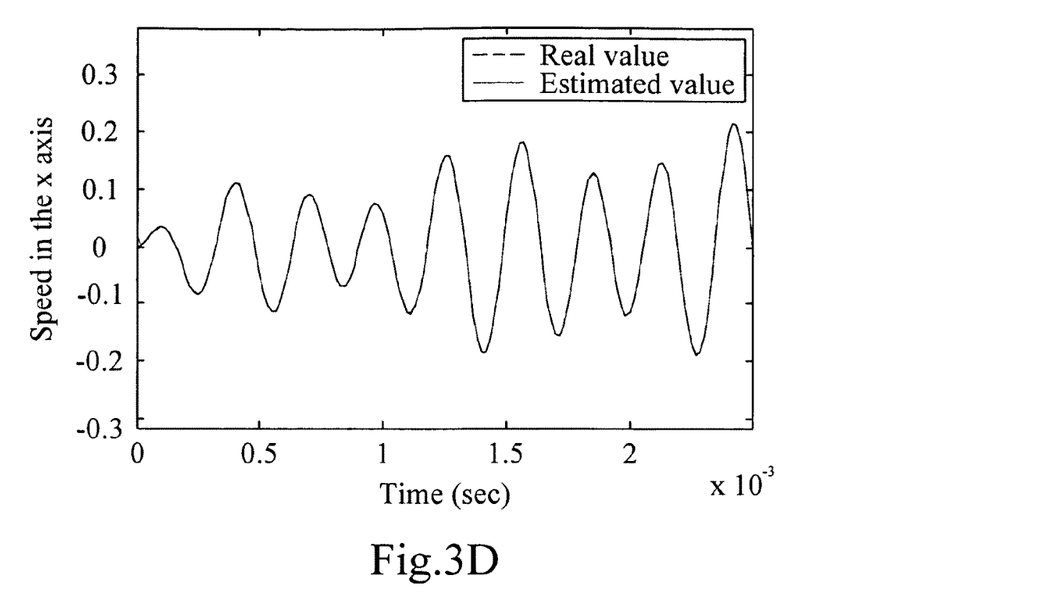
Figure 3E:
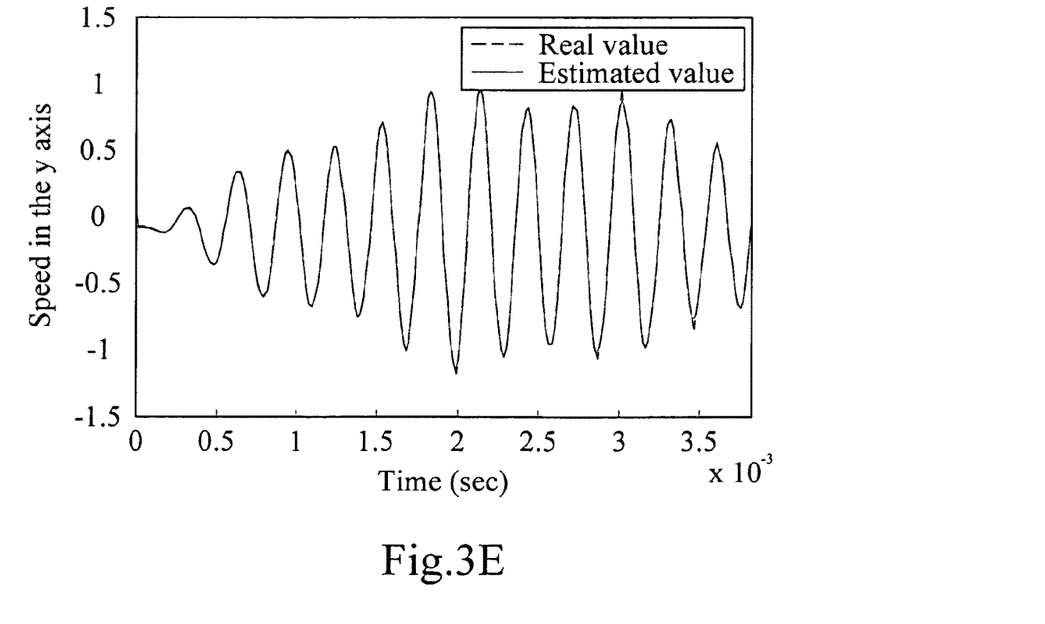
Figure 4A:
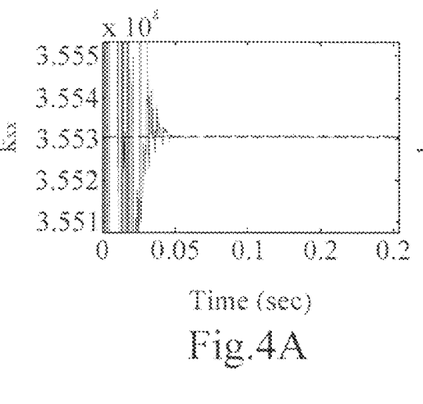
FIGS. 4A-4H are diagrams schematically showing that eight system parameters which are estimated by a state observer, including $k_{xx}$, $k_{yy}$, $k_{xy}$, $d_{xx}$, $d_{yy}$, $d_{xy}$, m and the angular velocity $\Omega_z$, and the eight system parameters converge to preset values.
Figure 4B:
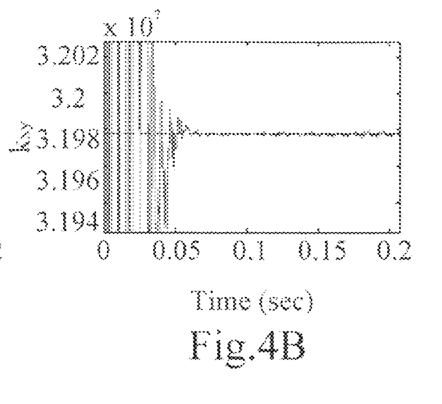
Figure 4C:
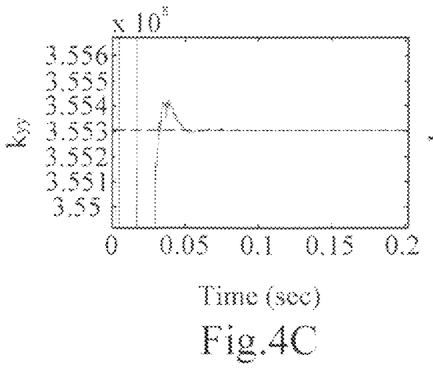
Figure 4D:
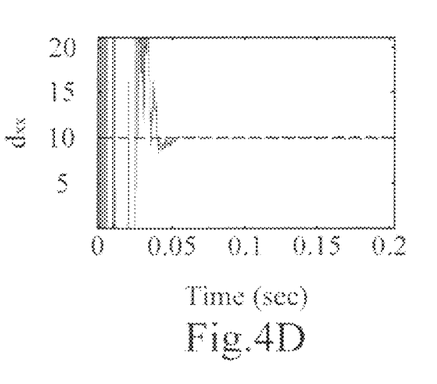
Figure 4E:
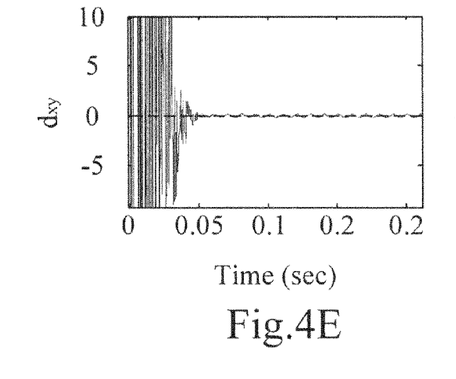
Figure 4F:
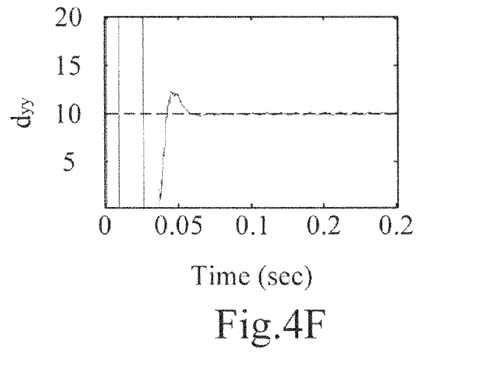
Figure 4G:
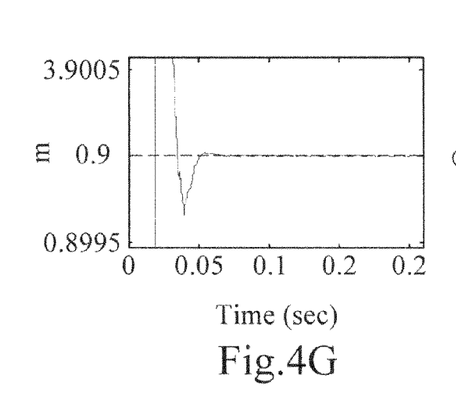
Figure 4H:
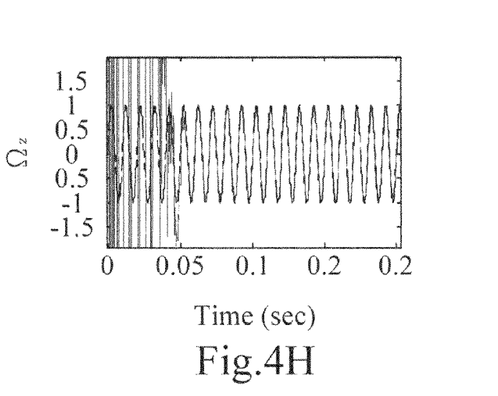

Refer to FIG. 3A for a single-axis control input $u_x$, which is used as the input of a gyroscope system and varied with the time. The single-axis control input $u_x$ is a combination of two frequency signals, such as the signal expressed by Equation (10). The gyroscope 4 receives the single-axis control input $u_x$ and outputs a plurality of gyroscopic system dynamic outputs $O_G$, including the position at the x axis, the position at the y axis, the speed in the x axis, and the speed in the y axis, which are represented by the dashed lines shown in FIGS. 3B-3E. The state observer 5 receives the gyroscopic system dynamic outputs $O_G$ from the gyroscope 4, performs a difference operation of the gyroscopic system dynamic outputs $O_G$ and the model system dynamic outputs $O_M$, and undertakes a feedback compensation to estimate the model system dynamic outputs $O_M$ and eight system parameters, including the angular velocity $\Omega_z$. As shown in FIGS. 3B-3E, the model system dynamic outputs $O_M$ (represented by solid lines) estimated by the state observer 5 gradually approach the gyroscopic system dynamic outputs $O_G$.

As shown in FIGS. 4A-4H, the eight system parameters converge to the simulated parameter values given in Table.1 within 80 ms, including the mass m, the spring constants $k_{xx}$, $k_{yy}$ and $k_{xy}$, the damping coefficients $d_{xx}$, $d_{yy}$ and $d_{xy}$ and the angular velocity $\Omega_z$.

In conclusion, the present invention proposes a gyroscope system having imperfection compensation, which comprises a gyroscope and a state observer, and which the control system performs signal processing to feed back compensation for the mechanical imperfections of the gyroscope, and which uses the cross-axis elastic coefficient or the cross-axis damping coefficient to estimate the system parameters of the gyroscope, including the mass m, the main-axis spring constants $k_{xx}$ and $k_{yy}$, the cross-axis spring constant $k_{xy}$, the main-axis damping coefficients $d_{xx}$ and $d_{yy}$, the cross-axis damping coefficient $d_{xy}$ and the angular velocity $\Omega_z$. Distinct from the conventional technology, the gyroscope system has advantages of simple structure, low cost and high precision, and is exempted from expensive post-processes.

The embodiments described above are only to exemplify the present invention but not to limit the scope of the present invention. Instructed by the abovementioned description and the attached drawings, the persons skilled in the art should be able to make various equivalent modifications and variations. However, any equivalent modification or variation should be also included within the scope of the present invention.

What is claimed is:

1. A single-axis-control-input gyroscope system having imperfection compensation comprising:
   a gyroscope including a mechanical structure, a dynamic behavior of the mechanical structure being described with a plurality of system parameters and a plurality of dynamic equations; wherein the gyroscope receives a single-axis control signal and outputs a plurality of gyroscopic system dynamics, and wherein the single-axis control signal includes at least two frequency signals;
   a state observer coupled to the gyroscope, including a single-axis-control-input gyroscope model which receives the single-axis control signal and generates a plurality of model system dynamics;
   wherein the state observer performs a difference operation on the plurality of gyroscopic system dynamics and the plurality of model system dynamics and then works out a plurality of compensation values and feeds back the plurality of compensation values to the single-axis-control-input gyroscope model to estimate the plurality of system parameters.

2. The single-axis-control-input gyroscope system having imperfection compensation according to claim 1, wherein the system parameters include a mass of the gyroscope, two main-axis spring constants, a cross-axis spring constant, two main-axis damping coefficients, a cross-axis damping coefficient and an angular velocity.

3. The single-axis-control-input gyroscope system having imperfection compensation according to claim 1, wherein the gyroscopic system dynamic are confined to an x-y plane defined by an x axis and a y axis, and the single-axis control signal is input to the gyroscope via one of the x axis and the y axis; there are exactly two model system dynamic outputs input to the state observer, and the two model system dynamic outputs are position at the x axis and position at the y axis, or speed in the x axis and speed in the y axis.

* * * * *